United States Patent [19]
Larson

[11] 3,857,059
[45] Dec. 24, 1974

[54] OSCILLOSCOPE SWEEP SYSTEM WITH TWO SWEEP GENERATORS HAVING SPEED RATE SWITCHES AND SWEEP MODE SWITCHES OPERATED BY A CONTROL KNOB

[75] Inventor: Lester L. Larson, Portland, Oreg.

[73] Assignee: Tektronix, Inc., Beaverton, Oreg.

[22] Filed: June 1, 1973

[21] Appl. No.: 365,875

Related U.S. Application Data

[63] Continuation of Ser. No. 126,084, March 19, 1971, abandoned.

[52] U.S. Cl. ..................... 315/391, 200/4, 200/17
[51] Int. Cl. ........................................... H01j 29/70
[58] Field of Search ............... 315/24, 25, 22, 27 R; 200/4, 17, 14, 18; 337/200, 201

[56] References Cited
UNITED STATES PATENTS

| | | | |
|---|---|---|---|
| 2,576,836 | 11/1951 | Hilsinger | 200/14 |
| 3,512,427 | 5/1970 | Metcalf | 200/4 |
| 3,551,733 | 12/1970 | Johnson | 315/25 X |
| 3,599,034 | 8/1971 | Fischer | 315/25 X |
| 3,761,649 | 9/1973 | Gasaras et al. | 200/17 |

*Primary Examiner*—Maynard R. Wilbur
*Assistant Examiner*—J. M. Potenza
*Attorney, Agent, or Firm*—Adrian J. LaRue

[57] ABSTRACT

A sweep system for a cathode ray oscilloscope is described in which a single control knob is employed to operate both sweep rate switches of a pair of sweep generators and two sweep mode switches interconnecting such generators by rotation and longitudinal movement of such knob to provide single sweep, delayed sweep, and intensified sweep modes of operation. The switch control means includes a pair of concentric inner and outer shafts which are connected to different rate switches for rotation thereof either selectively or as ganged switches. The sweep output mode switch is operated by longitudinal movement of the inner shaft and the delay time mode switch is operated by movement of the switch knob into and out of its ganged position. The switch knob is attached to the inner shaft and is locked by a detent pin to a control member on the outer shaft in one relative rotational position to rotate both rate switches simultaneously in such ganged position and provide the single sweep operation. The switch knob is pulled outward into a second longitudinal position to disconnect the two switch shafts to enable rotation of only the inner shaft to provide the intensified sweep mode. The knob is then pushed back to the first longitudinal position without ganging the two shafts together to provide the delayed sweep mode.

3 Claims, 6 Drawing Figures

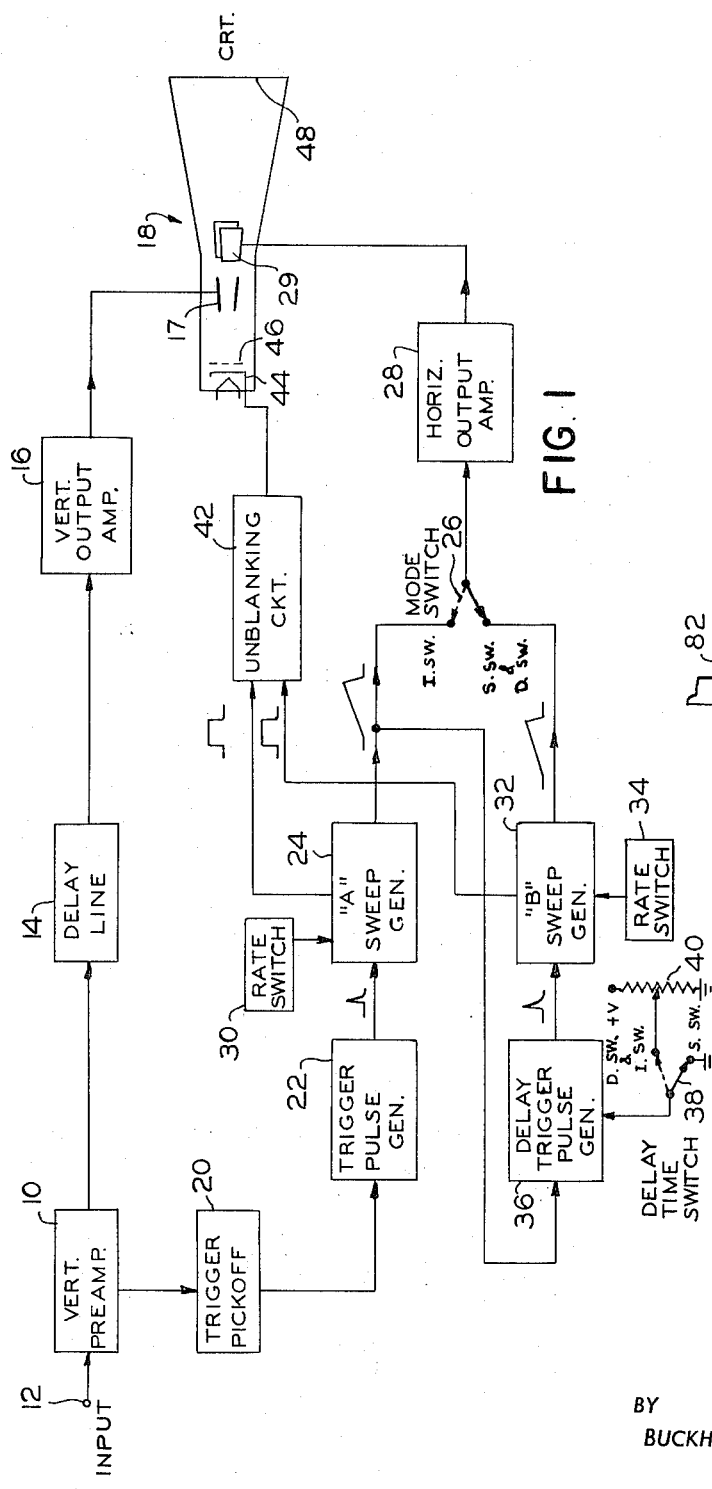
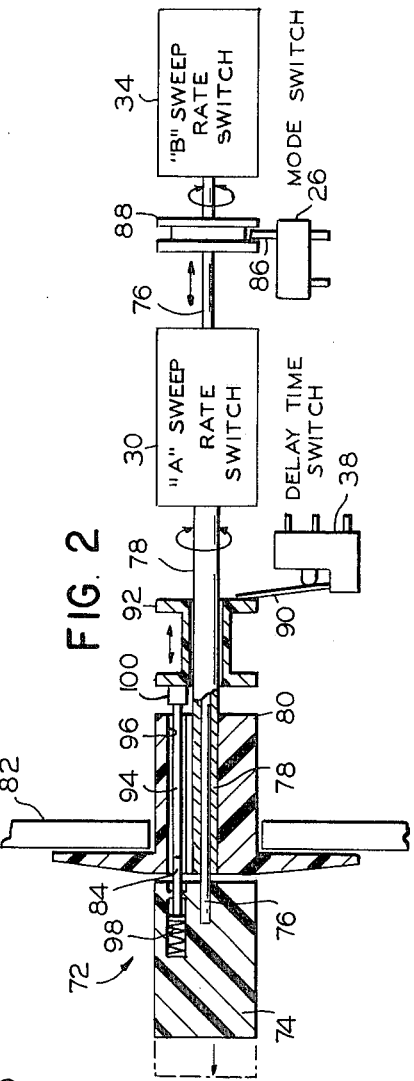
LESTER L. LARSON
INVENTOR
BY
BUCKHORN, BLORE, KLARQUIST & SPARKMAN
ATTORNEYS Patented Dec. 24, 1974

"SINGLE SWEEP"

"DELAY SWEEP"

"INTENSIFIED SWEEP"

LESTER L. LARSON
INVENTOR

BY
BUCKHORN, BLORE, KLARQUIST & SPARKMAN
ATTORNEYS

3,857,059

OSCILLOSCOPE SWEEP SYSTEM WITH TWO SWEEP GENERATORS HAVING SPEED RATE SWITCHES AND SWEEP MODE SWITCHES OPERATED BY A CONTROL KNOB

This is a continuation of application, Ser. No. 126,084, filed Mar. 19, 1971 now abandoned, for Lester L. Larson.

BACKGROUND OF THE INVENTION

The subject matter of the present invention relates generally to sweep systems having two sweep generators which are interconnected by mode switches to provide different modes of operation, and in particular, to such a sweep system in which the mode switches and the two rate switches of the sweep generators are operated by a single switch control knob.

The sweep system of the present invention is especially useful in a cathode ray oscilloscope to provide three modes of operation referred to as single sweep, delayed sweep, and intensified sweep modes of operations. The term "single sweep operation" as used herein refers to the normal sweep operation of an oscilloscope, not the prearmed sweep operation used for high speed transient input signals. Oscilloscopes of this general type have previously employed separate switch controls to operate the sweep mode switches and the sweep rate switches. In some cases, the same switch control has been used to operate a pair of sweep rate switches in two sweep generator circuits as shown in U.S. Pat. No. 3,187,118 of Butler et al. However, prior oscilloscopes have always used a separate switch control for operating the mode switches which selectively connect the outputs of the two sweep generators to the input of a horizontal amplifier, and selectively connect a fixed voltage source and a variable voltage source to the reference voltage input of the delay trigger pulse generator. As a result, such previous oscilloscopes have been more difficult to operate and have required greater front panel mounting space for their switch controls. The sweep system of the present invention avoids these disadvantages by employing a switch control for selectively operating both of the sweep rate switches of the two sweep circuits as well as the two mode switches by means of a single control knob which is rotated and moved between two longitudinal positions to provide the three modes of operation.

It is, therefore, one object of the present invention to provide an improved sweep system employing a single switch control to operate two sweep rate switches and two sweep mode switches connected to a pair of sweep generator circuits.

Another object of the invention is to provide such a sweep system in which the switch control is of simple operation and requires less mounting space than previous controls.

A further object of the invention is to provide such a sweep system in which the sweep control includes a single operating knob which is moved between two longitudinal positions and rotated to provide single sweep, delayed sweep and intensified sweep modes of operation.

An additional object of the present invention is to provide such a sweep system as the horizontal sweep system of a cathode ray oscilloscope.

Still another object is to provide an improved switch apparatus in which a single knob is employed to operate two rotary switches selectively or as ganged switches and to operate two other switches selectively by longitudinal movement and rotation of such knob.

BRIEF DESCRIPTION OF DRAWINGS

Other objects and advantages of the present invention will be apparent from the following detailed description of the preferred embodiments thereof and from the attached drawings of which:

FIG. 1 is a block diagram of a conventional cathode ray oscilloscope with two sweep generators having rate switches and mode switches operated by the single switch control means of the present invention;

FIG. 2 is an enlarged sectional view of the switch control means used to operate the rate switches and mode switches in the circuit of FIG. 1;

DESCRIPTION OF PREFERRED EMBODIMENTS

Figure 3:
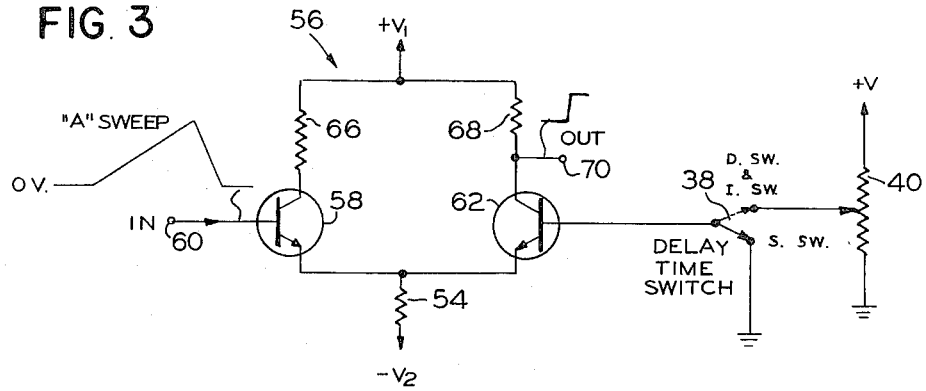
FIG. 3 is a simplified electrical circuit of a comparator circuit provided in the delayed trigger pulse generator used in the sweep system in FIG. 1.

A delay sweep type of cathode ray oscilloscope having two sweep generators is shown in FIG. 1. This oscilloscope includes a vertical preamplifier circuit 10 having its input connected to an input terminal 12 to which is applied the input signal whose waveform is being measured. The output of the vertical preamplifier is transmitted through a delay line 14 to the input of a vertical output amplifier 16. The output of the vertical amplifier 16 is applied to the vertical deflection plates 17 of a cathode ray tube 18. A trigger pickoff circuit 20 is connected at its input to the vertical preamplifier 10 and at its output to a trigger pulse generator 22 in order to produce a trigger pulse at the output of such pulse generator which is related in time to the receipt of an input signal at input terminal 12. A first sweep generator 24, hereafter referred to as the A sweep generator, has its input connected to the output of the trigger pulse generator 22 and has its output connected to one fixed contact of a two-position sweep output mode switch 26. A horizontal output amplifier 28 has its input connected to the movable contact of mode switch 26 and its output connected to the horizontal deflection plates 29 of the cathode ray tube 18. Thus, when an input signal is received at input terminal 12, it causes the trigger pulse generator 22 to trigger the A sweep generator 24 so that it produces a sweep signal which may be applied to the horizontal deflection plates 29 when the input signal is applied to the vertical deflection plates 17 after being delayed by delay line 14. The A sweep generator 24 is provided with a sweep rate switch 30 which changes the slope or sweep rate of the ramp shaped voltage sweep signal produced at the output of such sweep generator. Thus, the rate switch 30 may be a compound rotary switch which connects different resistor and capacitor combinations to the sweep generator 24 to change the slope of the leading edge of its sweep signal output.

A second sweep generator 32, hereafter referred to as B sweep generator, is provided in the oscilloscope of FIG. 1 which also has sweep rate switch 34 similar in operation to rate switch 30, previously described. A delay trigger pulse generator 36 connected at its input to the sweep output of the A sweep generator 24 and connected at its output to the input of B sweep generator 32, is employed to trigger such B sweep generator. The delay trigger pulse generator 36 produces an output trigger pulse at a time equal to or later than the start of the A sweep signal, determined by the setting of a delay time mode switch 38 connected by its movable contact to a reference voltage input of such pulse generator. The delay time switch 38 has two fixed contacts, one of which is connected to a source of fixed D.C. reference voltage which may be ground, and the other of which is connected to a source of variable D.C. reference voltage at the movable contact of a potentiometer 40, having its end terminals connected, for example, between a positive D.C. supply voltage and ground. The output of the B sweep generator 32 is connected to another fixed contact of the sweep output mode switch 26. Thus, the setting of the first mode switch 26 determines whether the A sweep signal or the B sweep signal is applied to the horizontal output amplifier 28. During single sweep (S.SW.) and delay sweep (D.SW.) modes of operation, the mode switch 26 transmits the B sweep signal of the horizontal output amplifier 28, while the A sweep signal is transmitted through such switch during intensified sweep (I.SW.) operation. The second mode switch 38 determines how long the delay trigger pulse and B sweep signal are delayed relative to the start of the A sweep signal. During single sweep (S.SW.) operation, mode switch 38 is connected to ground which provides no time delay, while during delay sweep (D.SW.) and intensified sweep (I.SW.) such mode switch is connected to the movable contact of potentiometer 40 to provide a time delay of an amount dependent upon the setting of such potentiometer.

An unblanking circuit 42 is connected at one input to the unblanking output of the A sweep generator 24 and is connected at its other input to the unblanking output of the B sweep generator 36 to add these two unblanking signals together. The output of the unblanking circuit is connected to the Z axis input of the cathode ray tube 18 which may be the cathode 44 of the tube to overcome the negative bias voltage applied to its control grid which normally cuts off such tube. The unblanking circuit 42 operates in a conventional manner to unblank or turn on the electron gun of the cathode ray tube so that an electron beam strikes the phosphor screen 48 of such tube only during the leading edge of the sweep signal applied to the horizontal deflection plates 29 of such tube, not during the trailing edge of such signal corresponding to the retrace portion of the sweep.

Figure 4A:
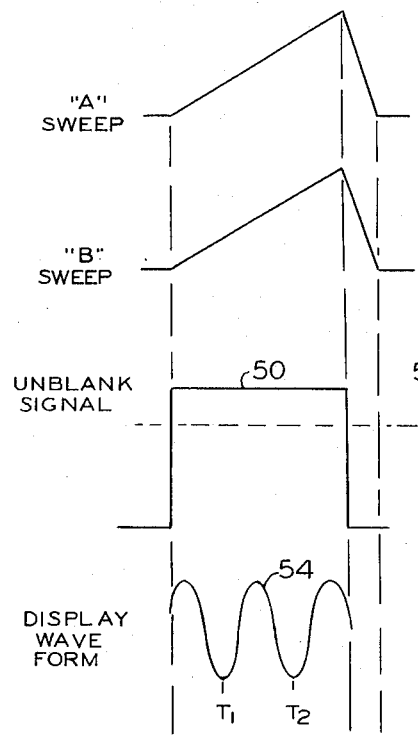
FIGS. 4A, 4B and 4C show the waveforms of signals produced by the system of FIG. 1 during three different modes of operation.

The operation of the oscilloscope circuit of FIG. 1 in the single sweep, delayed sweep and intensified sweep modes is hereafter described with reference to FIGS. 4A, 4B and 4C, respectively. During the single sweep operation of FIG. 4A, the mode switch corresponding has its movable contact set in trigger single sweep (S.SW.) position shown in FIG. 1, while the delay time switch 38 is also set in the single sweep (S.SW.) position shown in FIG. 1. As a result, the B sweep signal is transmitted through of transistors 26 and the horizontal amplifier 28 to the horizontal deflection plates 29 of the cathode ray tube. Also, the delay trigger pulse generator 36 triggers the B sweep generator 38 at a time corresponding to the start of the A sweep signal since the reference voltage applied by the delayed time control switch 38 is ground or zero volts which is the quiescent D.C. voltage level of the A sweep signal. In addition, the rate switches 30 and 34 of the A sweep generator and the B sweep generator are both set at the same sweep rate so that both the A and B sweep signals start and terminate at the same time. This means that the unblanking signal of the B sweep generator is the same width as the unblanking signal of the A sweep generator so that when these two unblanking signals are added together, an unblanking output signal 50 is produced at the output of the unblanking circuit 42 which exceeds the cutoff voltage level 52 of the cathode ray tube. As a result, a display waveform trace 54 is produced on the phosphor screen 48 of the cathode ray tube which corresponds to the waveform of the input signal applied to input terminal 12.

Figure 4B:
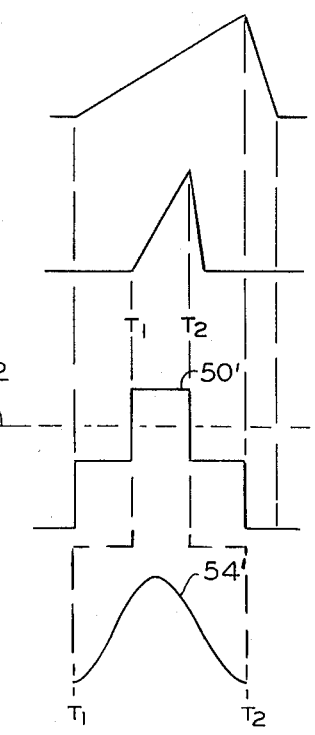

To provide the delay sweep mode of operation shown in FIG. 4B, the mode switches 26 and 38 are placed in the delay sweep (D.SW.) positions of FIG. 1. In this position, the B sweep signal is transmitted through the mode switch 26 and the horizontal amplifier 28 to the horizontal deflection plates 29, and the delay trigger pulse generator 36 triggers the B sweep generator at some time delay after the start of the A sweep signal. This time delay is determined by the setting of the movable contact of delay time potentiometer 42 in a manner hereafter described with respect to FIG. 3. In addition, the rate switch 34 is provided with a different setting than the rate switch 30 so that the B sweep signal has a faster sweep rate than the A sweep signal. As a result, the unblanking signal produced by the B sweep generator is considerably narrower than the unblanking signal produced by the A sweep generator, and the output unblanking pulse 50' of the unblanking circuit 42 only exceeds the cutoff level 52 during the B sweep signal. This produces a delay sweep display waveform 54' of only that portion of the input signal waveform which occurs during the B sweep signal, such delay sweep display being magnified due to the faster sweep rate of the B sweep signal. Thus, in FIG. 4B, the start of the B sweep signal is delayed for a time $T_1$ with respect to the start of the A sweep and terminates at a time $T_2$, which is before the end of the A sweep. Assuming that the A sweep signals in FIGS. 4A and 4B have the same sweep rates, the time $T_1$ and $T_2$ of display waveform 54 of FIG. 4A correspond to the beginning and end of the magnified waveform portion 54' of FIG. 4B. This delay sweep mode of operation enables the oscilloscope operator to examine different portions of the single sweep display in greater detail by magnifying such portions.

Figure 4C:
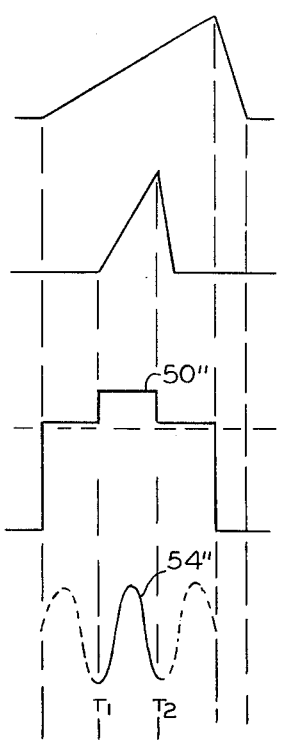

The intensified sweep mode of operation shown in FIG. 4C is achieved by moving the mode switch 26 to the I.SW. position shown in FIG. 1 so that the A sweep signal is transmitted through such switch and the output amplifier 28 to the horizontal deflection plates 29. However, the delay time switch 38 remains in the same position previously set during the delay sweep operation so that the movable contact of the potentiometer 40 is still connected to the delay trigger pulse generator. As a result, if the sweep rate switches 30 and 34 are left in the settings used during the delay sweep operation, the portion of the input signal waveform corresponding to the magnified display 54' of FIG. 4B is displayed as an intensified portion 54'' of greater brightness. Thus, the intensified sweep operation enables the oscilloscope operator to quickly determine which portion of the display waveform is being magnified during the delay sweep operation, and for this reason is usually performed before the delay sweep operation. During the intensified sweep operation, the unblanking signal output 50" of the unblanking circuit 42 is of a different shape than the unblanking output signal 50' as the result of increasing the amplitude of the unblanking signal produced by the A sweep generator above the cutoff level 52. This means that the cathode ray tube is unblanked during the entire time of both the A and B sweep signals, but produces a high brightness trace only during the B sweep signal to provide the intensified waveform portion 54" while displaying the remainder of the input signal waveform at a lower intensity.

As shown in FIG. 3, the delay trigger pulse generator 36 includes a voltage comparator 56, a simplified circuit of which is hereafter described. The comparator includes a first NPN type transistor 58 having its base connected to an input terminal 60 corressponding to the input of the delay triger pulse generator. A second NPN type transistor 62 is provided with its emitter connected to the emitter of transistor 58 and through a common bias resistor 64 to a source of negative D.C. supply voltage. The collectors oftransistors 58 and 60 are connected through load resistors 66 and 68, respectively, to a source of positive D.C. supply voltage. The collector of transistor 62 is connected to the output terminal 70 of the comparator circuit and the base of such transistor is connected as a reference voltage input to the movable contact of the delay time switch 38. The A sweep signal applied to input terminal 60 is compared with the D.C. reference voltage applied to the base of transistor 62 so that when such A sweep signal exceeds such reference voltage, it renders transistor 62 non-conducting. When comparator transistor 62 switches from a conducting state to a nonconducting state, it produces a positive going step voltage on its collector and output terminal 76 which may be differentiated or regenerated by triggering a tunnel diode, to provide the delay trigger pulse applied to the B sweep generator. When the A sweep signal has a quiescent D.C. voltage level of zero volts, the delay time switch 38 is connected to a reference voltage of zero volts or ground in the single sweep (S.SW.) position of such switch so that an output pulse is produced at output terminal 70 at a time corresponding to the start of the A sweep signal. In either delay sweep (D.SW.) or intensified sweep (I.SW.) modes of operation, the switch 38 is moved into a position connected to the movable contact of potentiometer 40 to apply a more positive D.C. reference voltage to the base of transistor 62 so that such transistor is rendered nonconducting at some time after the start of the A sweep signal. Of course, the amount of time delay in the production of the delay trigger pulse at output terminal 70 is determined by the setting of the potentiometer 40 because this varies the applied D.C. reference voltage.

As shown in FIG. 2, a single switch control 72 made in accordance with the present invention is employed to operate both of the sweep rate switches 30 and 34 as well as the two mode switches 26 and 38 used in the sweep system of FIG. 1. A single control knob 74 is employed to rotate the A sweep rate switch 30 and the B sweep rate switch 34, either together as ganged switches or selectively as unganged switches by rotation and longitudinal movement in the manner shown in U.S. Pat. No. 3,187,118 of Butler, referred to previously. The rotor of the B sweep rate switch 34 is connected to an inner shaft 86 to which the knob 74 is attached. The rotor of the A sweep rate switch is connected to a tubular outer shaft 78, which is coupled to the knob 74 only in the ganged position provided when such knob is in the right longitudinal position and in the one relative rotational position of the two shafts producing the same sweep rates on both rate switches 30 and 34, as shown in FIG. 2. The tubular outer shaft 78 is attached to an annular switch control member 80 which is rotatably mounted through a hole in the front panel 82 of the oscilloscope. In the ganged position of the switch control 72, the knob 74 is pushed longitudinally to the right and rotated until a spring biased detent pin 84 resiliently mounted on such knob engages an opening in the control member 80 to lock the control member to the knob. This ganged position of the switch control 72 provides the single sweep mode of operation of the oscilloscope as hereafter discussed.

The mode switch 26 of FIG. 1 is provided as a detented slide switch in FIG. 2, having a switch actuator arm 86 which engages an annular groove in a coupling member 88 fixedly attached to the inner shaft 76 for longitudinal movement therewith between two longitudinal positions set by the detent of such slide switch. The mode switch 26 is moved to the single sweep position (S.SW.) when the knob 74 and inner shaft 76 are moved to the right longitudinal position shown. The delay time switch 38 in the circuit of FIG. 1 is provided as a microswitch 38 in FIG. 2 having a spring biased actuator arm 90 which engages the right hand end of a spool shaped coupling member 92 loosely mounted for sliding movement on the outer switch shaft 78. A coupling rod 94 is slidably mounted within a passageway 96 through the control member 80, such rod extending between the detent pin 84 and the right end of the coupling member 92. The detent pin 86 is urged to the right by a coil spring 98 contained within a cavity in the knob 74 housing such detent pin. As a result, in the ganged position of the switch control 72, detent pin 84 extends into the passageway 96 into contact with the coupling rod 94 and pushes such coupling rod to the right to move the coupling member 92 and the actuator arm 90 until switch 38 is moved into the single sweep position (S.SW.)

For the intensified sweep mode of operation, the knob 74 is pulled longitudinally to the left until the coupling 88 moves the mode switch 26 into the intensified sweep position (I.SW.). When the knob 74 is pulled into the left longitudinal position, the detent pin 84 moves out of passageway 96 to disconnect the shafts and provide unganged operation of the rate switches 30 and 34. At the same time, the detent pin moves out of engagement with a coupling rod 94 so that such coupling rod is automatically moved up to the left due to the spring bias on the actuating arm 90 of the delay time switch 38. The right end of the coupling rod 94 is provided with an enlarged head portion 100 which engages the rear surface of the switch control member 80 to limit further movement of such rod in the left direction. As a result, the movable contact of delay time switch 38 automatically returns by spring action to its normal position corresponding to the delay sweep and intensified sweep position (D.SW. and I.SW.) of FIG. 1. It should be noted that in the intensified sweep position of knob 74, such knob can only rotate the inner shaft 76 to change the setting of the B sweep rate switch 34, while the A sweep rate switch 30 remains in the position set during single sweep operation in the ganged position.

In order to provide the delay sweep mode of operation, the control knob 74 is pushed back to the right longitudinal position and remains in the rotational position set during the intensified sweep operation so that the rate switches remain unganged and the detent pin 84 is not inserted into the passageway 96 of the switch control member 80. This means that the delay time switch 38 remains in its delay sweep and intensified position (D.SW. and I.SW.) while the mode switch 26 is returned to the single sweep and delay sweep position (S.SW. and D.SW.) of FIG. 1.

As will be apparent from the above-description of FIG. 2, the switch control means 72 of the present invention has the advantage that a single knob 74 is employed to operate both sweep rate switches 30 and 34, as well as both mode switches 26 and 38 in an extremely simple manner merely by moving knob 74 longitudinally and rotating such knob to provide the single sweep, intensified sweep and delay sweep modes of operation.

It will be obvious to those having ordinary skill in the art that many changes may be made in the details of the above-described preferred embodiments of the present invention without departing from the spirit of the invention. For example, the slide switch providing the mode switch 26 in FIG. 2 can be replaced by a push-pull operated switch attached to the end of the switch shaft 26 by extending such shaft beyond the rate switch 34. Therefore, the scope of the invention should only be determined by the following claims.

I claim:

1. In an oscilloscope having a pair of sweep generating circuits for operation in normal, intensified, and delayed sweep modes, a switch apparatus which comprises:

a first switch for changing the rates of sweep signals produced by one of said pair of sweep generator circuits, said first switch being a rotary switch and said one of said pair of sweep generator circuits being a normal sweep generator circuit;

a second switch for changing the rates of sweep signals produced by the other of said pair of sweep generator circuits, said second switch being a rotary switch and said other of said pair of sweep generator circuits being a delayed sweep generator circuit;

a third switch for selectively connecting the outputs of said pair of sweep generator circuits to a beam deflection means of a cathode ray tube in said oscilloscope; and switch control means including a tubular outer shaft connected to said second switch and extending through said outer shaft to a single knob which is attached to said inner shaft for rotation thereof and for moving said inner shaft longitudinally between two positions for selectively operating said first and second switches, said inner shaft being coupled to said third switch for operation thereof in response to longitudinal movement of said inner shaft between said two positions;

said switch control means also including coupling means for selectively engaging said first switch with said second switch to provide ganged operation thereof or disengaging said first switch to provide independent operation of said second switch.

2. The switch apparatus according to claim 1 which further includes a fourth switch for applying a selective reference voltage to said delayed sweep generator, and wherein said outer shaft includes a control member attached thereto, said coupling means includes detent means for locking said knob to said control member to enable simultaneous rotation of said inner and outer shafts in the ganged position, said coupling means further including actuating means for operating said fourth switch when said knob is moved into and out of said ganged position.

3. The switch apparatus according to claim 2 wherein said actuating means includes a coupling member mounted for sliding movement on said outer shaft in engagement with said fourth switch, and a coupling rod engaging said coupling member and mounted for sliding movement within a passageway extending through said control member, and said detent means includes a detent pin resiliently mounted on said knob so that in said ganged position said pin extends into said passageway and moves said coupling rod causing the coupling member to operate said fourth switch.

* * * * *

UNITED STATES PATENT OFFICE
CERTIFICATE OF CORRECTION

Patent No. 3,857,059                    Dated December 24, 1974

Inventor(s) LESTER L. LARSON

It is certified that error appears in the above-identified patent and that said Letters Patent are hereby corrected as shown below:

Column 3, line 56 change "corresponding" to --26--

Column 3, line 57 change "trigger" to --the--

Column 3, line 61 change "of transistors" to --switch--

Column 5, line 22 change "oftransistors" to --of transistors--

Signed and sealed this 20th day of May 1975.

(SEAL)
Attest:

RUTH C. MASON
Attesting Officer

C. MARSHALL DANN
Commissioner of Patents
and Trademarks